United States Patent
Kato et al.

(10) Patent No.: US 8,954,248 B2
(45) Date of Patent: Feb. 10, 2015

(54) CONTROL APPARATUS FOR VEHICLE

(71) Applicants: Shunya Kato, Seto (JP); Akihiro Kimura, Toyota (JP); Yuma Mori, Nukata-gun (JP); Hideki Furuta, Anjo (JP)

(72) Inventors: Shunya Kato, Seto (JP); Akihiro Kimura, Toyota (JP); Yuma Mori, Nukata-gun (JP); Hideki Furuta, Anjo (JP)

(73) Assignees: Toyota Jidosha Kabushiki Kaisha, Toyota (JP); Aisin AW Co., Ltd., Anjo-shi (JP)

( * ) Notice: Subject to any disclaimer, the term of this patent is extended or adjusted under 35 U.S.C. 154(b) by 0 days.

(21) Appl. No.: 14/164,346

(22) Filed: Jan. 27, 2014

(65) Prior Publication Data
US 2014/0228170 A1    Aug. 14, 2014

(30) Foreign Application Priority Data
Feb. 12, 2013   (JP) .................................. 2013-024988

(51) Int. Cl.
G06F 19/00    (2011.01)
B60W 10/12   (2012.01)
B60W 10/04   (2006.01)

(52) U.S. Cl.
CPC ............... *B60W 10/12* (2013.01); *B60W 10/04* (2013.01)

USPC .......................................................... 701/68

(58) Field of Classification Search
None
See application file for complete search history.

(56) References Cited

U.S. PATENT DOCUMENTS

| 6,709,364 | B2 * | 3/2004 | Eguchi et al. .................. 477/174 |
| 7,158,873 | B2 * | 1/2007 | Eich et al. ......................... 701/68 |
| 8,244,420 | B2 * | 8/2012 | Shimohira et al. .............. 701/22 |
| 8,260,513 | B2 * | 9/2012 | Shelton et al. ................... 701/68 |
| 8,352,136 | B2 * | 1/2013 | Saito ................................ 701/54 |
| 2013/0297122 | A1 * | 11/2013 | Gibson et al. .................... 701/22 |

FOREIGN PATENT DOCUMENTS

JP   A-2006-159929   6/2006

* cited by examiner

*Primary Examiner* — Dirk Wright
(74) *Attorney, Agent, or Firm* — Oliff PLC

(57) ABSTRACT

A control apparatus for a vehicle including a differential section having a first rotating element coupled to a prime mover and a second rotating element connected to drive wheels via an engaging and disengaging apparatus, including: a controller configured to control connection of the engaging and disengaging apparatus, the controller being configured to adjust a power of the prime mover, the controller being configured to reduce the power of the prime mover when performing connection of the engaging and disengaging apparatus, and the controller being configured to reduce more power of the prime mover as a speed of rotation of the first rotating element is lower.

7 Claims, 8 Drawing Sheets

CONTROL APPARATUS FOR VEHICLE

INCORPORATION BY REFERENCE

The disclosure of Japanese Patent Application No. 2013-024988 filed on Feb. 12, 2013 including the specification, drawings and abstract is incorporated herein by reference in its entirety.

BACKGROUND OF THE INVENTION

1. Field of the Invention

This invention relates to a control apparatus for a vehicle, and more particularly to power reduction control for reducing the power of a drive source when an engaging and disengaging apparatus, such as an automatic transmission apparatus, is connected.

2. Description of Related Art

Technology is widely available for temporarily reducing the power of a drive source and reducing gear shift shocks, and the like, when an engaging and disengaging apparatus (clutch or brake), such as an automatic transmission apparatus, is connected. The hybrid vehicle disclosed in Japanese Patent Application Publication No. 2006-159929 (JP 2006-159929 A), for example, implements power reduction control by load sharing between an engine and an electric motor, when shifting gear in an automatic transmission apparatus.

SUMMARY OF THE INVENTION

However, in a vehicle in which a first rotating element is coupled to a prime mover, and a second rotating element has a differential section coupled to drive wheels, the rotational energy in the differential section varies depending on the differential state of the differential section. Therefore, if power reduction control of the prime mover is carried out without taking account of this differential state, the amount of power reduction may be larger than necessary, or excessively small, and there is a risk of deterioration in drivability, such as gear shift shocks, and deterioration in the fuel consumption and exhaust gases, and the like.

Problems of this kind do not only occur when shifting gear in an automatic transmission apparatus, and may also arise similarly, for example, in cases where the vehicle is coasting with the accelerator off and the transmission of drive power cut off, and power reduction control is then implemented to restart the transmission of drive power by connecting the engaging and disengaging apparatus in order to shift to driven travel in accordance with an off to on operation of the accelerator.

This invention implements suitable power reduction control regardless of variations in the differential state of the differential section, when implementing power reduction control of a prime mover in connecting an engaging and disengaging apparatus in a vehicle having a differential section.

The control apparatus for a vehicle relating to a first aspect of this invention including a differential section having a first rotating element coupled to a prime mover and a second rotating element connected to drive wheels via an engaging and disengaging apparatus, includes: a controller configured to control connection of the engaging and disengaging apparatus, the controller being configured to adjust a power of the prime mover, the controller being configured to reduce the power of the prime mover when performing connection of the engaging and disengaging apparatus, and the controller being configured to reduce more power of the prime mover as a speed of rotation of the first rotating element is lower.

In the control apparatus for a vehicle relating to the first aspect of this invention, it is possible to adopt a composition wherein the controller is configured to determine, as a reference value, a speed of rotation of the first rotating element at which there is zero change in a rotational energy of the differential section with respect to change in the speed of rotation of the first rotating element in case a speed of rotation of the second rotating element is uniform, the controller is configured to calculate a rotational speed differential between an actual speed of rotation of the first rotating element and the reference value, and the controller is configured to determine an amount of power reduction of the prime mover on the basis of the rotational speed differential.

The control apparatus for a vehicle relating to a second aspect of this invention including a differential section having a first rotating element coupled to a prime mover and a second rotating element connected to drive wheels via an engaging and disengaging apparatus, includes: a controller configured to control connection of the engaging and disengaging apparatus, the controller being configured to adjust a power of the prime mover, the controller being configured to reduce the power of the prime mover when performing connection of the engaging and disengaging apparatus, the controller being configured to determine a surplus power from a predetermined power balance equation using, as parameters, a power of the prime mover, a drive power transmitted to the drive wheels via the engaging and disengaging apparatus, and an inertia power of the differential section, and the controller being configured to determine an amount of reduction in the power of the prime mover on the basis of the surplus power.

In the control apparatus for a vehicle relating to the second aspect of this invention, it is possible to adopt a composition wherein a rotary machine operating at least as an electrical generator which is coupled to the differential section, the controller is configured to calculate the surplus power in accordance with the following power balance equation (1)

$$\Delta P = Pe - Pc - Pb - P\text{iner} \quad (1)$$

where $\Delta P$ represents the surplus power, Pe represents the power of prime mover, Pc represents the drive power transmitted to the drive wheels, Pb represents the power of the rotary machine, Piner represents the inertia power of the differential section.

Moreover, in the control apparatus for a vehicle relating to the second aspect of this invention, it is possible to adopt a composition wherein the controller is configured to calculate the inertia power of the differential section by using respective anticipated rotational accelerations of the first rotating element and the second rotating element, the controller is configured to determine the anticipated rotational accelerations on the basis of a response delay of the prime mover.

Moreover, the control apparatus for a vehicle relating to the first aspect or second aspect of this invention further includes: an automatic transmission apparatus configured to be coupled to the engaging and disengaging apparatus and to switch between a plurality of gears, includes: the controller is configured to reduce the power of the prime mover immediately before an input rotational speed of the automatic transmission apparatus reaches a synchronous rotational speed of a prescribed gear of the plurality of gears, when establishing the prescribed gear while the input rotational speed is increased by the power of the prime mover.

According to the control apparatus for a vehicle relating to the aspects of this invention, since the power reduction amount of the prime mover is made larger when the speed of rotation of the first rotating element coupled to the prime mover is low compared to when the speed of rotation is high, in the case of performing power reduction control of the prime mover when connecting the engaging and disengaging apparatus in a vehicle having a differential section, and therefore power reduction control is carried out appropriately, regardless of variation of the differential state of the differential section. Consequently, it is possible to improve the drivability, fuel consumption, exhaust gases, and the like, since the speed of rotation of the prime mover can be reduced and smooth uninterrupted gear shift can be performed.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
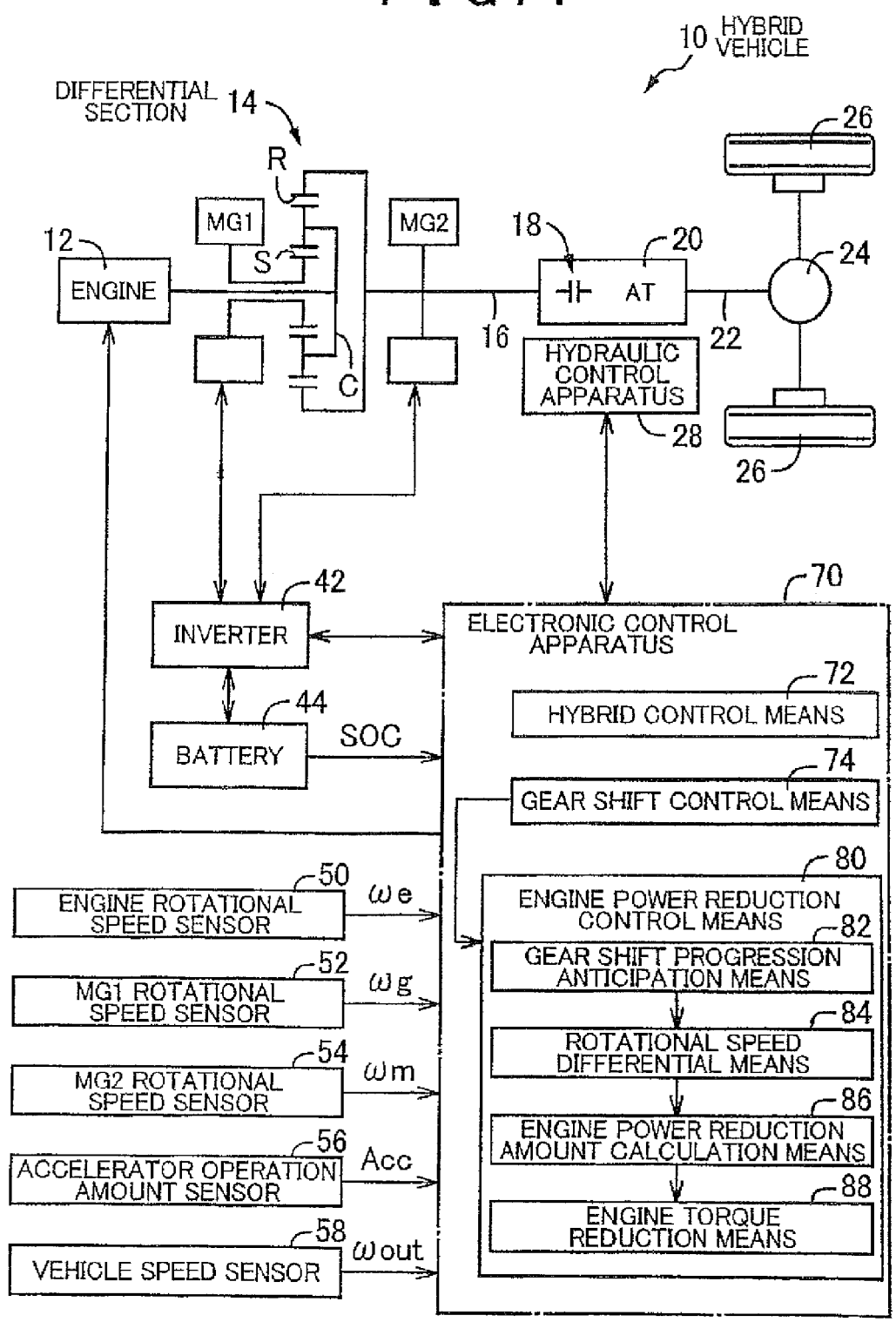
FIG. 1 is a general schematic drawing in which the principal parts of a control system are illustrated in association with a schematic view of a hybrid vehicle to which this invention is suitably applied.

Below, the embodiments of this invention are described in detail with reference to the drawings. FIG. 1 is a general schematic drawing including a general view of a drive system of a hybrid vehicle 10 to which this invention is suitably applied. This hybrid vehicle 10 includes, in coaxially disposed fashion, an engine 12 which is an internal combustion engine generating drive power by combustion of fuel, a first motor-generator MG1 and a second motor-generator MG2 each capable of being used as an electric motor or an electric generator, and a differential section 14 constituted by a single-pinion type of planetary gear device. In other words, the engine 12 is coupled to a carrier C of the differential section 14, while an intermediate transmission shaft 16 is coupled to a ring gear R and the first motor-generator MG1 is coupled to a sun gear S. Furthermore, the second motor-generator MG2 is coupled to the intermediate transmission shaft 16. The engine 12 corresponds to a prime mover, the carrier C corresponds to a first rotating element, the ring gear R corresponds to a second rotating element, and the second motor-generator MG2 is a rotary machine which is coupled to the second rotating element. It is also possible to provide a separating apparatus, such as a clutch, between the engine 12 and the differential section 14, and it is also possible to interpose a speed reducing mechanism, or the like, between the second motor-generator MG2 and the intermediate transmission shaft 16.

Figure 2:
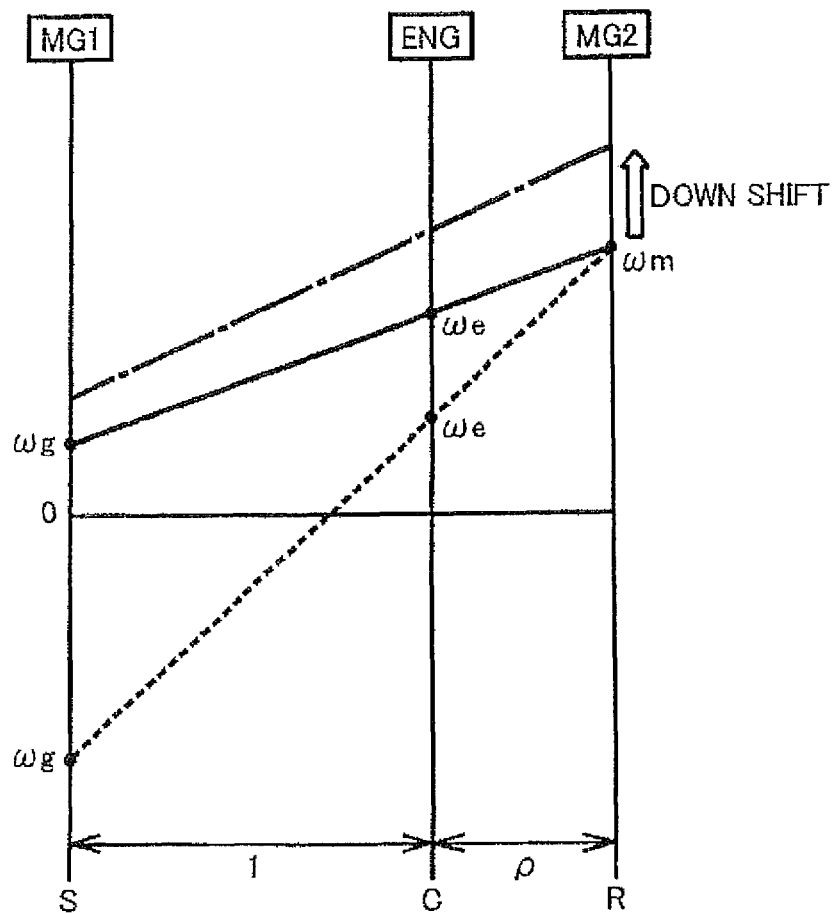
FIG. 2 is one example of a colinear graphing of a differential section of FIG. 1.

FIG. 2 is a colinear graphing in which the rotational speeds of the three rotating elements S, C, R of the differential section 14 can be linked by straight lines, and in the case of the differential section 14 according to this embodiment which includes a single pinion planetary gear device, the carrier C is disposed at an intermediate position and the sun gear S and ring gear R are disposed at either end. Furthermore, on the colinear graphing of the rotating elements S, C, R, the intervals are set to 1:ρ in accordance with the gear ratio ρ of the planetary gear device (=number of teeth of sun gear S/number of teeth of ring gear R). When the carrier C is driven to rotate by the engine 12, the ring gear R, and also the intermediate transmission shaft 16, are driven to rotate by a torque corresponding to the torque of first motor-generator MG1 which is coupled to the sun gear S. The second motor-generator MG2 produces a drive force when set to powered operation and used as an electric motor, and changes the battery 44 via the inverter 42 when set to regenerative operation and used as an electric generator. The value mg in FIG. 2 is the speed of rotation of the first motor generator MG1 (MG1 rotational speed), me is the speed of rotation of the engine 12 (engine rotational speed), and ωm is the speed of rotation of the second motor-generator MG2 (MG2 rotational speed). The engine rotational speed me is the same as the speed of rotation of the first rotating element, in other words, the carrier C, and the MG2 rotational speed ωm is the same as the speed of rotation of the second rotating element, in other words, the ring gear R.

The intermediate transmission shaft 16 is an input shaft of the automatic transmission apparatus 20 and the outputs of the engine 12 and the second motor generator MG2 are transmitted to the automatic transmission apparatus 20 via this intermediate transmission shaft 16, and are transmitted further via an output shaft 22 and a differential gear device 24, to left and right drive wheels 26. The automatic transmission apparatus 20 is a non-continuous automatic transmission apparatus based on a planetary gear system, or the like, which establishes a plurality of gears having different speed ratios, by engaged and released states of a plurality of hydraulic friction engaging apparatuses (clutch and/or brake) 18, and in which gear changing is controlled by electromagnetic hydraulic control valves or switching valves, and the like, provided in a hydraulic control apparatus 28. The friction engaging apparatuses 18 function as engagement and disengagement apparatuses which connect and disconnect the transmission of drive power.

The hybrid vehicle 10 is equipped with an electronic control unit 70. The electronic control unit 70 includes a so-called microprocessor having a central processing unit (CPU), a read only memory (ROM), a random access memory (RAM), an input/output interface and the like, and carries out signal processing in accordance with a program stored previously in the ROM, while using a temporary storage function of the RAM. The electronic control unit 70 receives signals indicating the engine rotational speed ωe, the MG1 rotational speed ωg, the MG2 rotational speed ωm, the accelerator pedal operation amount (accelerator operation amount) Acc, and the rotational speed of the output shaft 22 (which corresponds to the vehicle V) ωout, respectively, from an engine rotational speed sensor 50, an MG1 rotational speed sensor 52, an MG2 rotational speed sensor 54, an accelerator operation amount sensor 56, and a vehicle speed sensor 58. The MG2 rotational speed ωm is the same as the input rotational speed of the automatic transmission apparatus 20. Apart from this, various other information required for different control procedures is supplied, such as a signal indicating a state of charge (SOC) of the battery 44, and so on.

In functional terms, the electronic control unit 70 is provided with hybrid control means 72, gear shift control means 74 and engine power reduction control means 80. The hybrid control means 72 causes the vehicle to travel by controlling the operation of the engine 12 and the motor-generators MG1, MG2 so as to switch between a plurality of predetermined travel modes, such as an engine travel mode in which the vehicle travels by using the engine 12, for example, as a source of drive power, and a motor travel mode in which the vehicle travels by using the second motor-generator MG2 as a source of drive power, in accordance with the operational state, such as the accelerator operation amount Acc, vehicle speed V, and so on.

Figure 3:
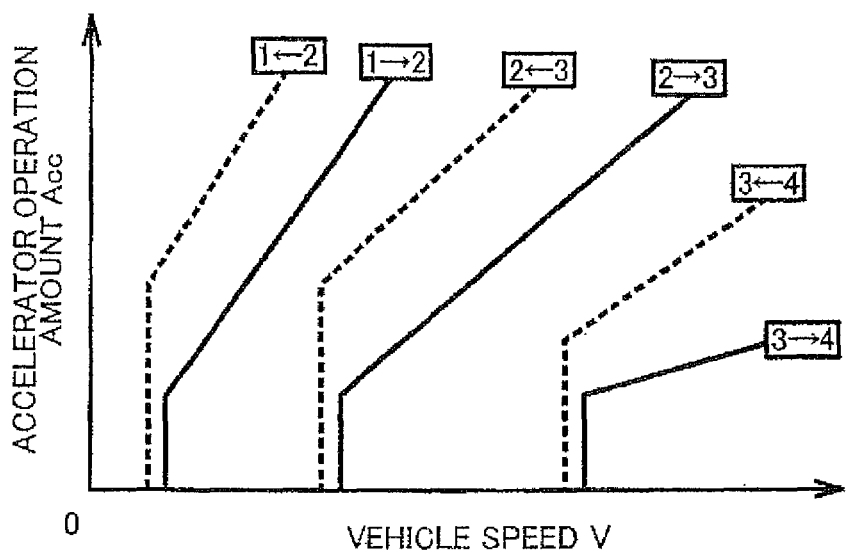
FIG. 3 is one example of a transmission map of the automatic transmission apparatus in FIG. 1.

The gear shift control means 74 switches between a plurality of gears in the automatic transmission apparatus 20, in accordance with a shift map previously determined in relation to the operation state, such as the accelerator operation amount Acc and vehicle speed V, etc., by controlling electromagnetic hydraulic control valves or switching valves, and the like, provided in the hydraulic control apparatuses 28 so as to switch the coupled and released states of the plurality of hydraulic friction engaging apparatuses 18, FIG. 3 is one example of a shift map of an automatic transmission apparatus 20 having four forward gears, in which the solid lines are up-shift lines, the dotted lines are down-shift lines, and a prescribed hysteresis is applied. It is also possible to use the required drive power or required torque, or the like, instead of the accelerator operation amount Acc.

The engine power reduction control means 80 temporarily reduces the engine power Pe in the case of a power-on down shift, where a down shift is performed by the gear shift control means 74 while the accelerator pedal is depressed, in other words, when a down shift is performed with the MG2 rotational speed ωm, which is the input rotational speed of the automatic transmission apparatus 20, increased by the power Pe of the engine 12. In particular, when performing a down shift, gear shift power reduction control is performed to temporarily reduce the engine power Pe immediately before the MG2 rotational speed ωm reaches the synchronous rotational speed ωmdoki of the gear after the down shift. Thereby, improvements are achieved in the drivability, such as gear shift shocks due to the engagement of the friction engaging apparatus 18, and in fuel consumption, exhaust gases, and the like. In functional terms, the engine power reduction control means 80 is provided with gear shift progression anticipation means 82, rotational speed differential calculation means 84, engine power reduction amount calculation means 86, and engine torque reduction means 88, and by carrying out signal processing in accordance with the flowchart in FIG. 4, the gear shift power reduction control is performed. Steps S2 and S3 in FIG. 4 correspond to the gear shift progression anticipation means 82, step S4 corresponds to the rotational speed differential calculation means 84, step S5 corresponds to the engine power reduction amount calculation means 86, and steps S6 and S7 correspond to the engine torque reduction means 88.

Figure 4:
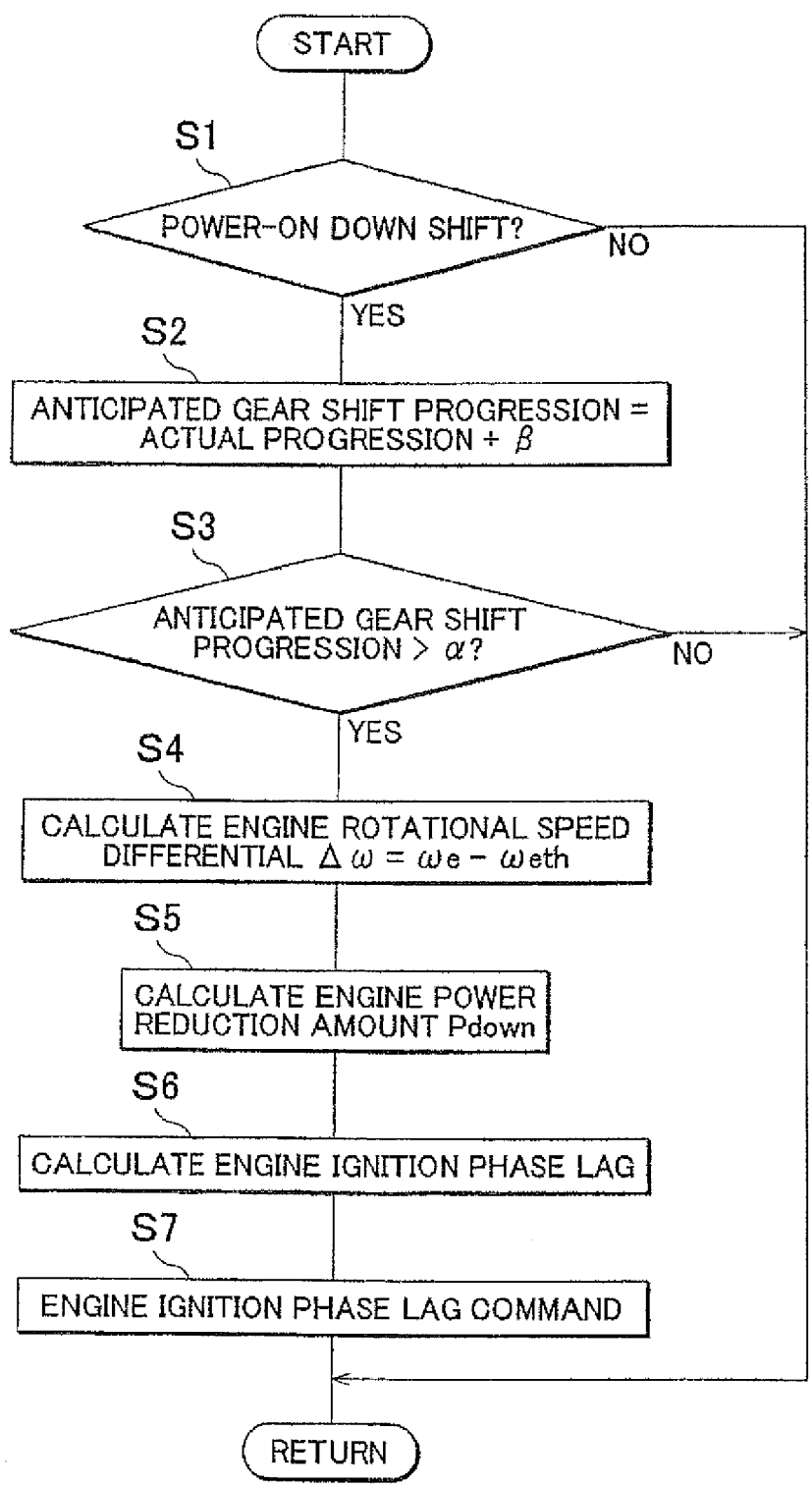
FIG. 4 is a flowchart showing a specific illustration of gear shift power reduction control which is carried out by the engine power reduction control means in FIG. 1.

In step S1 in FIG. 4, it is determined whether or not a power-on down shift is being performed, and in the case of a power-on down shift, steps from S2 onwards are implemented. It is possible to determine whether or not a power-on down shift is being performed on the basis of whether or not the accelerator operation amount Acc is equal to or greater than a prescribed value when a down shift is performed by the gear shift control means 74, for example, but it is also possible to supply information indicating that a power-on down shift is being performed, from the gear shift control means 74.

In step S2, the actual gear shift progression A is calculated by Formula (2) below, and an anticipated gear shift progression (A+β) is calculated by adding an anticipated correction value β determined on the basis of the response delay in the phase lag control of the ignition timing in the engine 12, to the actual gear shift progression A.

$$A=(\omega m-\omega m1)/(\omega m2-\omega m1) \quad (2)$$

Formula (2) is established using the current MG2 rotational speed ωm, the MG2 rotational speed ωm1 at the start of gear shift, and the MG2 rotational speed ωm2 after down shift, and the actual gear shift progression A is determined within the range of 0 to 1. The MG2 rotational speed ωm2 is the same as the synchronous rotational speed ωmdoki of the gear after down shift, and is determined by multiplying the output rotational speed ωout by the speed ratio γ of the gear after down shift. The MG2 rotational speed ωm1 at the start of gear shift may be calculated by multiplying the output rotational speed wont by the speed ratio γ of the gear before down shift. Furthermore, the anticipated correction value β is the degree of progression of the gear shift during the response delay until the engine torque is actually changed under phase lag control, and is set previously to a value of approximately 0.1 to 0.3, for example, by experimentation or simulation, etc., in relation to the type of down shift, the engine rotational speed ωe, the engine torque Te, and the like.

In step S3, it is determined whether or not the anticipated gear shift progression (A+β) is greater than the predetermined determination value α; while (A+β)≤α, the procedure terminates in this state and steps from S1 on are carried out repeatedly, whereas if the anticipated gear shift progression (A+β) exceeds the determination value α, then the power reduction control from step S4 on is started. The determination value α is set appropriately in order that power reduction control is carried out suitably, and although it is possible to set a fixed value of approximately 0.7 to 0.9 by experimentation or simulation, etc., a value may also be set in relation to the type of down shift and the engine torque Te, or the like.

In step S4, the reference value ωeth of the engine rotational speed ωe is calculated on the basis of the actual MG2 rotational speed ωm, from the relationship in Formula (3) below, and the rotational speed differential Δω (=ωe−ωeth) with respect to the actual engine rotational speed ωe is calculated.

[Expression 1]

$$\omega eth = \frac{(1+\rho)Ig}{(1+\rho)^2 Ig + \rho^2 Ie} \times \omega m \quad (3)$$

The reference value ωeth is the engine rotational speed ωe at which there is zero change in the rotation energy Ediff of the differential section 14 in response to change in the engine rotational speed ωe, when the MG2 rotational speed ωm is uniform, and in the differential section 14 according to this embodiment which includes a single pinion planetary gear device, the relationship in Formula (3) is established. In Formula (3), Ig is the rotational inertia of the first motor-generator MG1 including the sun gear S which is the third rotating element, and Ie is the rotational inertia of the engine 12 including the carrier C which is the first rotating element.

Figure 5:
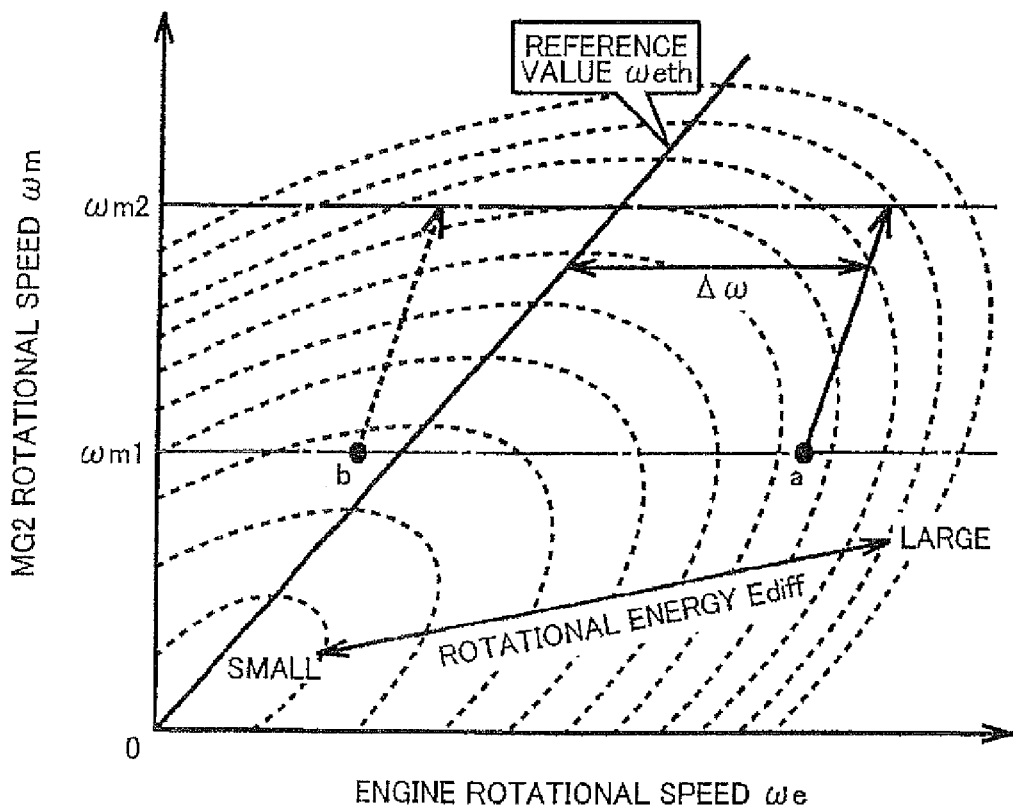
FIG. 5 is a diagram showing the rotational speed differential $\Delta\omega$ calculated in step S4 in FIG. 4 depicted on an equi-energy line chart of the rotational energy Ediff of the differential section.

The dotted graph lines in FIG. 5 indicate the rotational energy Ediff of the differential section 14 at uniform energy intervals (equi-energy lines), and the graph of the reference value ωeth is a straight line linking the positions where straight lines parallel to the horizontal axis are tangents to the equi-energy lines. Considering point a and point b in FIG. 5, at the start of a power-on down shift, point a is at a higher engine rotational speed ωe than point b, but in the case of a power-on down shift, as indicated by both the solid and dotted lines, it is desirable for the engine rotational speed ωe to be increased when the MG2 rotational speed ωm is increased to ωm2. For example, if performing a power-on down shift from the state indicated by the solid line in FIG. 2, both the MG2 rotational speed ωm and the engine rotational speed ωe increase, as indicated by the single-dotted line.

Here, if the MG2 rotational speed ωm approaches the rotational speed ωm2 after down shift, then desirably, the change in the MG2 rotational speed ωm, in other words, the rotational acceleration, is set to zero in order to control the engagement of the friction engaging apparatus 18 in the automatic transmission apparatus 20. If the input power Pe from the engine 12 is greater than the power transmitted to the drive wheels 26, in other words, the drive power Pe which is set in accordance with the engagement torque of the friction engaging apparatus 18, then the equi-energy lines of FIG. 5 spread in an expanding direction. In this case, if there is zero change in the MG2 rotational speed ωm, then it is necessary to consume the surplus power by change in the engine rotational speed ωe and the MG1 rotational speed ωg, in accordance with the power balance. To the right-hand side of the reference value ωeth, in other words, on the high side of the engine rotational speed ωe, the direction of increase of the engine rotational speed ωe (the rightward direction in FIG. 5) is the side towards which the equi-energy lines expand, in other words, the side towards which the rotational energy Ediff increases. Therefore, even if the engine power Pe is greater than the drive power Pc, power is consumed by increase in the engine rotational speed ωe, only a small reduction amount Pdown in the engine power Pe is required, and this reduction amount Pdown can even be set to zero.

To the left-hand side of the reference value ωeth, in other words, on the low side of the engine rotational speed ωe, the direction of increase of the engine rotational speed ωe (the rightward direction in FIG. 5) is the side towards which the equi-energy lines contract, in other words, the side towards which the rotational energy Ediff decreases. Consequently, if the engine power Pe is greater than the drive power Pc, there is an action reducing the engine rotational speed toe, and it is necessary to set a larger value for the reduction amount Pdown of the engine power Pe in order to increase the engine rotational speed ωe. In the case indicated by the dotted line in FIG. 2, if it is sought to increase the engine rotational speed ωe in accordance with a down shift, the MG1 rotational speed ωg which is rotating in the reverse direction becomes a relatively low-speed rotation, the rotational energy is reduced; and hence there may be cases where the rotational energy Ediff of the whole differential section 14 is reduced, and it is necessary to reduce the engine power Pe in order to increase the engine rotational speed ωe.

In this way, when the engine rotational speed ωe is to the high-speed side of the reference value ωeth, then the surplus power above the drive power Pc contributes to increase in the engine rotational speed ωe, and hence only a small reduction amount Pdown in the input power is necessary. On the other hand, when the engine rotational speed ωe is to the low-speed side of the reference value teeth, then the surplus power above the drive power Pc impedes increase in the engine rotational speed ωe, and hence a small reduction amount Pdown in the input power is necessary. Therefore, by setting the engine power reduction amount Pdown in relation to the rotational speed differential Δω between the actual engine rotational speed ωe and the reference value ωeth, it is possible to cause the friction engaging apparatus 18 to engage appropriately while achieving substantially zero change in the MG2 rotational speed ωm, and furthermore, the engine rotational speed ωe is increased appropriately and a drivability matching the drive power request of the driver can be guaranteed. It is also possible to calculate the reference value ωeth and also the rotational speed differential Δω, by anticipating (predicting) the engine rotational speed ωe and the MG2 rotational speed ωm, through taking account of the response delay in the phase lag control of the ignition timing of the engine 12.

Figure 6:
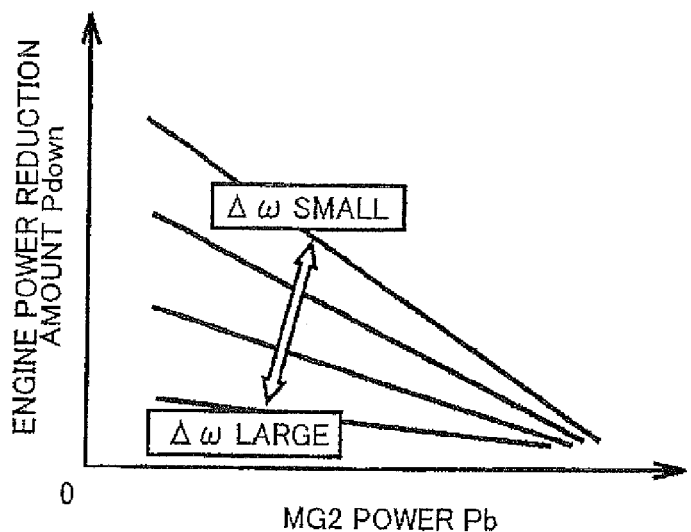
FIG. 6 is one example of a map used when calculating the engine power reduction amount Pdown in accordance with the MG2 power Pb in step S5 of FIG. 4.

Returning to FIG. 4, in the subsequent step S5, the engine power reduction amount Pdown is calculated on the basis of the rotational speed differential Δω. For example, the engine power reduction amount Pdown is calculated on the basis of the actual rotational speed differential Δω, from a predetermined map and calculation formula in which the engine power reduction amount Pdown becomes smaller, the greater the rotational speed differential Δω, as shown in FIG. 6. Making the engine power reduction amount Pdown smaller, the greater the rotational speed differential Δω, in this way means that the power reduction amount Pdown is made smaller, the greater the engine rotational speed ωe, in other words, the greater the speed of rotation of the first rotating element (carrier C) of the differential section 14, because the rotational speed differential Δω is the differential (ωe−ωeth) between the engine rotational speed ωe and the reference value ωeth. In this embodiment, a map is set by using the chargeable power (MG2 power) produced by the second motor-generator MG2 as a parameter, in addition to the rotational speed differential Δω, and the engine power reduction amount Pdown is made smaller, the greater the MG2 power Pb. In other words, by consuming the surplus power through regenerative control by the second motor-generator MG2, the power reduction amount Pdown of the engine 12 is made smaller accordingly, and furthermore the battery 44 is also charged. The MG2 power Pb is set in accordance with the SOC of the battery 44, and the like, and the regeneration side is positive (+). Apart from this, it is also possible to calculate the engine power reduction amount Pdown by using the engine power Pe, or the drive power Pc, or the differential between these (Pe−Pc), as parameters.

By calculating the phase lag amount in the ignition timing of the engine 12 on the basis of the engine power reduction amount Pdown in step S6, and outputting an ignition timing phase lag command at step S7, the engine torque Te is reduced and the engine power Pe is reduced by the reduction amount Pdown. Furthermore, the second motor-generator MG2 performs regenerative control at the MG2 power Pb. Consequently, the input power is reduced in accordance with the engine power reduction amount Pdown and the MG2 power Pb, and power reduction control of this kind is continued until the MG2 rotational speed (DM reaches the synchronous rotational speed ωmdoki and the prescribed friction engaging apparatuses 18 are completely engaged.

Thereupon, when the engine power Pe is restored, the engine torque Te is increased by a prescribed rate of change. In this case, desirably, the rate of change of the engine torque Te is made smaller, the higher the engine rotational speed ωe. In other words, if the engine rotational speed ωe is high, then the sensitivity of the change in the power Pe with respect to the torque Te becomes higher, the amount of change in the power Pe per unit time becomes smaller due to the rate of change of the torque Te being made smaller, the variation in the drive torque can be reduced, regardless of the magnitude of the engine rotational speed ωe, and the drivability upon restoration of the engine power can be improved.

Figure 7:
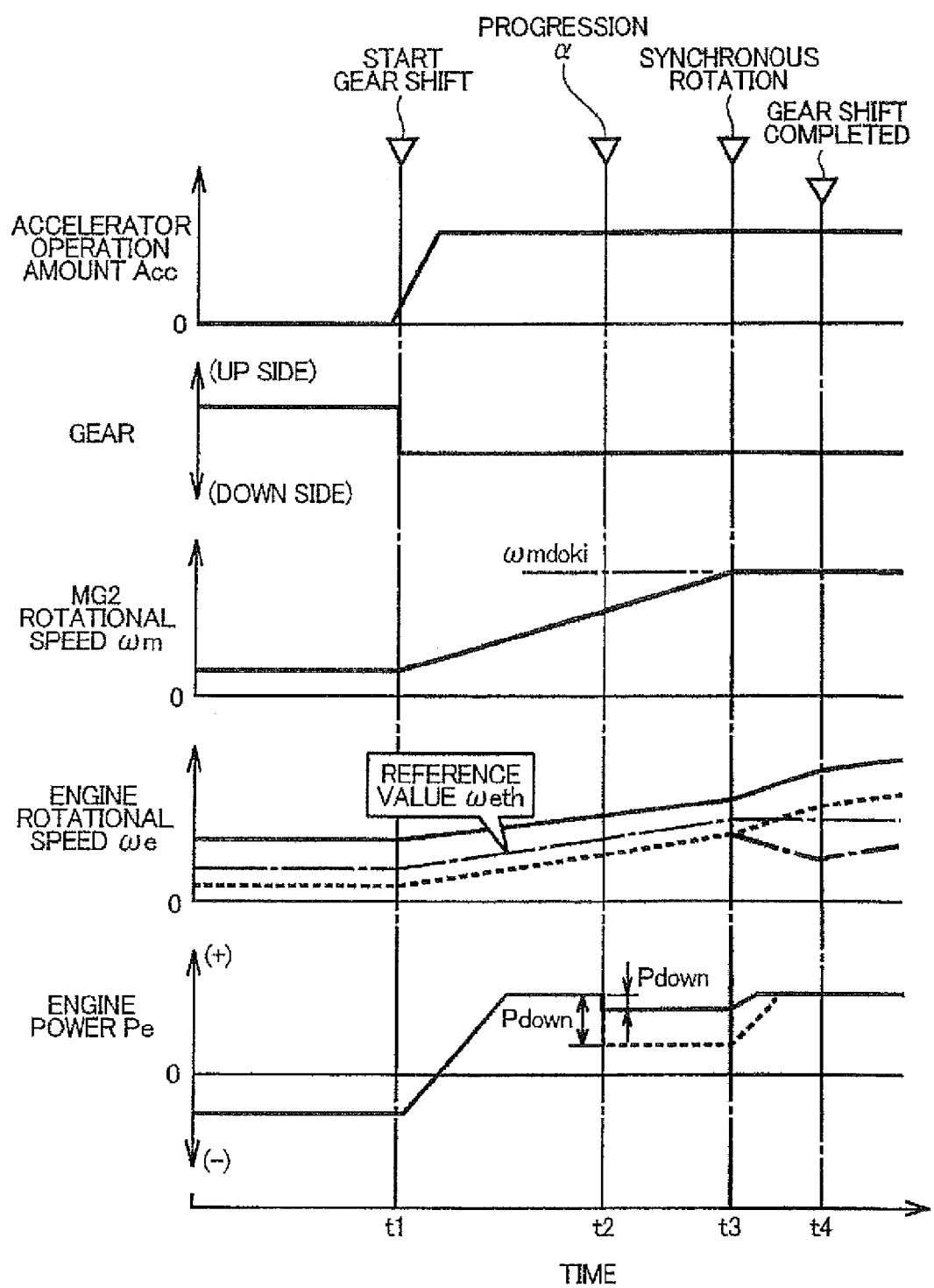
FIG. 7 is one example of time charts showing change in the operational state of the respective sections when gear shift power reduction control is carried out in accordance with the flowchart in FIG. 4, in the case of a power-on drive shift.
Figure 9:
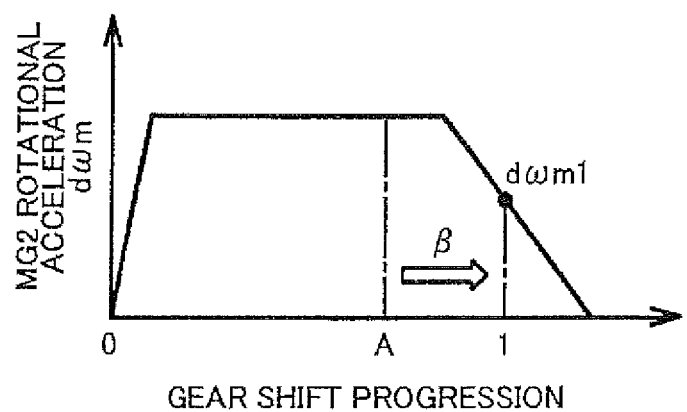
FIG. 9 is one example of a map used in calculating an anticipated MG2 rotational acceleration $d\omega m1$ in step R4 in FIG. 8.
Figure 10:
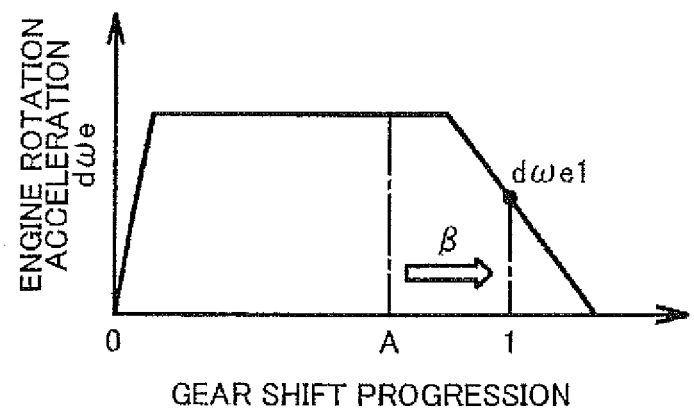
FIG. 10 is one example of a map used in calculating an anticipated engine rotational acceleration $d\omega e1$ in step R4 in FIG. 8.

FIG. 7 is one example of time charts showing change in the operational state of the respective sections when gear shift power reduction control is carried out in accordance with the flowchart in FIG. 4, in the case of a power-on drive shift. The solid lines in the engine rotational speed ωe and engine power Pe columns indicate a case where the engine rotational speed ωe has changed from point a in FIG. 5 as indicated by the solid line, and in this case, the speed of rotation is higher than the reference value ωeth. The dotted lines indicate a case where the engine rotational speed ωe has changed from point b in FIG. 5 as shown by the dotted line, and in this case, the speed of rotation is lower than the reference value ωeth. The time t1 is the time at which a down shift command is output in accordance with an increase in the accelerator operation amount Acc. When a down shift command is output in this way, output control of the engine 12 and first motor-generator MG1, and release control and engagement control of the friction engaging apparatuses 18 on the release side and the engagement side, and the like, is carried out in such a manner that the rotational accelerations doom, doe which are the amounts of change per unit time in the MG2 rotational speed ωm and the engine rotational speed ωe that are the input rotational speed of the automatic transmission apparatus 20 change in accordance with the target change pattern shown in FIGS. 9 and 10, for example.

The time t2 is the time at which the anticipated gear shift progression (A+β) exceeds the determination value α, the determination in step S3 becomes YES (affirmative) and the power reduction control in step S4 onwards is started. In this case, if the engine rotational speed ωe is lower than reference value θeth (dotted line), then the power reduction amount Pdown of the engine power Pe is large compared to a case where the engine rotational speed ωe is higher than the reference value ωeth (solid line). Therefore, it is possible to appropriately increase the engine rotational speed ωe while keeping the MG2 rotational speed ωm close to the synchronous rotational speed ωmdoki (which is the same as the MG2 rotational speed ωm2 in FIG. 5), regardless of variation in the rotational energy Ediff of the differential section 14 due to variation in the engine rotational speed ωe. On the other hand, in cases where the engine rotational speed coo is lower than the reference value ωeth as indicated by the dotted line, then if the reduction amount Pdown of the engine power Pe is reduced to the same extent as the solid line, the input power will be too great, the engine rotational speed ωe will fall as indicated by the single-dotted line, and hence there is a concern about deterioration in the drivability after completion of the gear shift. Moreover, in cases where the engine rotational speed ωe is higher than the reference value ωeth, as indicated by the solid line, then if the reduction amount Pdown of the engine power Pe is increased to the same extent as the dotted line, the input power will become too small, the engine rotational speed ωe will fall, and hence there is a concern about drivability, in addition to which there is a possibility of deterioration in the fuel consumption and exhaust gases due to the greater than necessary reduction in the engine power Pe.

The time t3 is the time at which the MG2 rotational speed ωm reaches the synchronous rotational speed ωmdoki after a down shift, and thereafter, the friction engaging apparatus 18 on the engaging side becomes completely engaged, and furthermore control for restoring the engine power Pe is implemented, and the sequence of gear shift control including the gear shift power reduction control is completed at time t4.

In this way, in the hybrid vehicle 10 according to this embodiment, when a down shift is performed while the MG2 rotational speed ωm, which is the input rotational speed of the automatic transmission apparatus 20, is increased by the engine power Pe, a power reduction control of the engine 12 is carried out immediately before the MG2 rotational speed ωm reaches the synchronous rotational speed ωmdoki after down shift, but since the power reduction amount Pdown is set to a larger value when the engine rotational speed ωe is low, compared to when it is high, this engine rotational speed ωe being the speed of rotation of the first rotating element (carrier C) of the differential section 14, then suitable power reduction control is carried out, regardless of variation in the differential state of the differential section 14, in other words, variation in the rotational energy Ediff. More specifically, regardless of variation in the engine rotational speed ωe, which is the speed of rotation of the first rotating element (carrier C), in a state where the change in the MG2 rotational speed ωm is limited by the engagement control of the friction engaging apparatuses 18, and more concretely, a state where the MG2 rotational speed ωm is kept near the synchronous rotational speed ωmdoki, the engine rotational speed ωe can be increased appropriately, reduction in the engine rotational speed ωe and smooth uninterrupted gear shift can be performed, and the drivability, fuel consumption and exhaust gases, etc., can be improved.

Furthermore, in this embodiment, the rotational speed differential Δω between the engine rotational speed ωe and the reference value ωeth is calculated, and the power reduction amount Pdown is determined on the basis of this rotational speed differential Δω but as FIG. 5 reveals, the rotational speed differential Δω reflects the change in the rotation energy Ediff with respect to the change in the engine rotational speed ωe. Therefore, it is possible to determine the power reduction amount Pdown by which the engine rotational speed ωe can be increased suitably, in a simple and appropriate fashion in accordance with the rotational speed differential Δω, regardless of variation in the differential state of the differential section 14. In particular, in this embodiment, since the MG2 power Pb is also used as a parameter, in addition to the rotational speed differential Δω, in order to determine the power reduction amount Pdown, then the power reduction control is carried out even more appropriately.

Moreover, in this embodiment, since the power reduction control from step S4 on starts when the anticipated gear shift progression (A+β) reaches the determination value α, then the power reduction control during gear shift can be performed appropriately, regardless of the response delay until the engine torque Te is actually reduced in the ignition time phase lag control of the engine 12, and the drivability, fuel consumption, exhaust gases, and the like, can be improved yet further.

Next, a further embodiment of this invention will be described. In the embodiment given below, parts which are substantially the same as the embodiment described above are labelled with the same reference numbers and detailed description thereof is omitted here.

Figure 8:
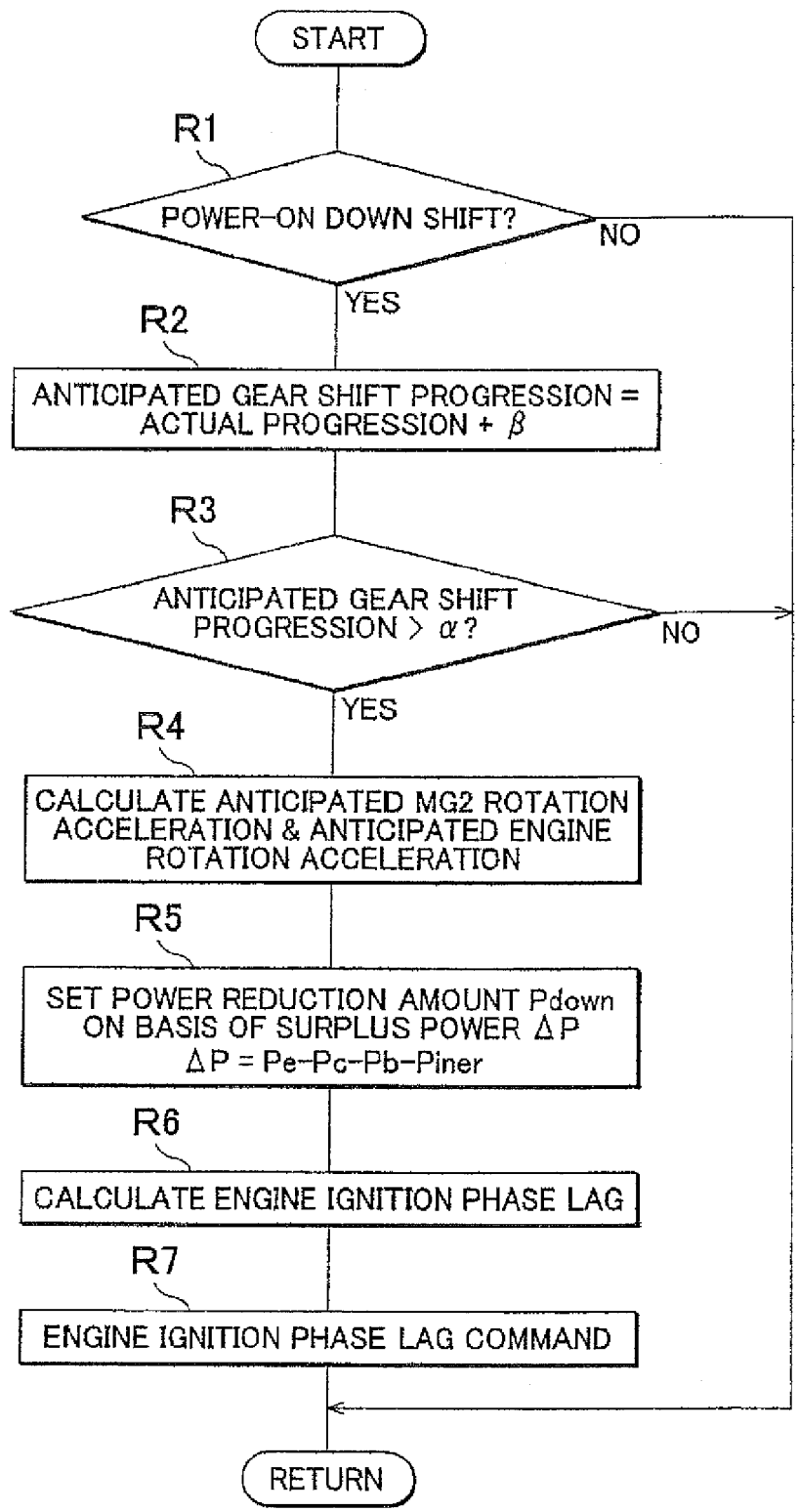
FIG. 8 is a flowchart illustrating an embodiment in which the power reduction amount Pdown is set on the basis of a surplus power $\Delta P$ determined in accordance with a power balance equation.

FIG. 8 is a flowchart illustrating a further example of the signal processing which is carried out by the engine power reduction control means 80, and which is implemented instead of the flowchart in FIG. 4. Steps R1 to R3, R6 and R7 in FIG. 8 are respectively the same as steps S1 to S3, S36 and S7 in FIG. 4, and only steps R4 and R5 are different. More specifically, steps R2 and R3 correspond to the gear shift progression anticipation means 82, and steps R6 and R7 correspond to the engine torque reduction means 88, but rotational acceleration anticipation means which executes step R4 is provided instead of the rotational speed differential calculation means 84. Furthermore, the engine power reduction amount calculation means 86 executes step R5 instead of step S5, and is composed so as to set the power reduction amount Pdown on the basis of the surplus power ΔP which is determined in accordance with the power balance equation (1).

In step R4 in FIG. 8, the anticipated MG2 rotational acceleration dωm1 and the anticipated engine rotational acceleration dωe1 are calculated on the basis of the anticipated gear shift progression (A+β) which is calculated in step R2. These rotational accelerations dωm, dωe are the amounts of change of the rotational speed ωm and ωe per unit time, and are controlled so as to change in response to the gear shift progression, in line with the predetermined target change pattern shown in FIGS. 9 and 10, depending on the type of gear shift, and the like, for example. Consequently, the anticipated MG2 rotational acceleration dωm1 and the anticipated engine rotational acceleration dωe1 can be determined respectively on the basis of the anticipated gear shift progression (A+β), from a map of this target change pattern.

In step R5, the engine power Pe, the drive power Pc transmitted to the drive wheels 26 via the friction engaging apparatus 18, the inertia power Piner of the differential section 14, and the power Pb of the second motor-generator MG2 are used as parameters to calculate the surplus power ΔP in accordance with the predetermined power balance equation (1), and the power reduction amount Pdown of the engine 12 is set on the basis of this surplus power ΔP. It is also possible to set the surplus power ΔP directly as the power reduction amount Pdown, but the power reduction amount Pdown can be made larger or smaller than the surplus power ΔP in such a manner that the engine rotational speed ωe changes in a prescribed fashion. In this embodiment, the engine rotational speed ωe is set so as to increase appropriately, similarly to the embodiment described above.

The engine power Pe is determined by multiplying the engine torque Te by the engine rotational speed ωe. The drive power Pc can be calculated using a predetermined map or calculation formula, on the basis of the transmission torque (engagement hydraulic pressure) Tc of the friction engaging apparatus 18 which is controlled to be engaged, and the MG2 rotational speed ωm, which is the input rotational speed. The MG2 power Pb is the chargeable power for charging the battery 44, which is determined by a predetermined map or calculation formula on the basis of the SOC, and the like. In the second motor-generator MG2, the motor torque (regenerative torque) Tm is set in accordance with the chargeable power, and the MG2 power Pb is positive (+) on the regenerative side when functioning as a generator.

Furthermore, the inertia power Piner of the differential section 14 is determined in accordance with the following expression (4) on the basis of the rotational inertia Ie of the engine 12 including the carder C, which is the first rotating element, the rotational acceleration dωe and the rotational speed ωe of the engine 12, the rotational inertia Im of the second motor-generation MG2 including the ring gear R which is the second rotating element, the rotational acceleration thorn and rotational speed ωm of the second motor-generator MG2, the rotational inertia Ig of the first motor-generator MG1 including the sun gear S which is the third rotating element, and the rotational acceleration dωg and rotational speed ωg of the first motor-generator MG1. The engine rotational speed ωe, the MG1 rotational speed ωg, and the MG2 rotational speed cam have the relationship in Expression (5) below, in the case of a differential section 14 which is a single pinion planetary gear device, and therefore eventually, it is possible to determine the inertia power Piner by a predetermined map or calculation formula, from two parameters, the rotational acceleration dωe of the engine 12 and the rotational acceleration dωm of the second motor-generator MG2. In this case, in this embodiment, the inertia power Piner is calculated by using the anticipated engine rotational acceleration dωe1 and the anticipated MG2 rotational acceleration dωm1 determined at step R4 above, as the engine rotational acceleration doe and the MG2 rotational acceleration dωm.

$$Piner = Ie \cdot d\omega e \cdot \omega e + Im \cdot d\omega m \cdot \omega m + Ig \cdot d\omega g \cdot \omega g \qquad (4)$$

$$\omega m + \rho \cdot \omega g - (1+\rho) - \omega e = 0 \qquad (5)$$

When the power reduction amount Pdown is set in step R5 in this way, steps R6 and R7 are carried out, and similarly to the embodiment described above, the power Pe of the engine 12 is reduced by the reduction amount Pdown, by implementing the ignition timing phase lag control of the engine 12.

In this embodiment, since the power reduction amount Pdown is set on the basis of the surplus power ΔP determined by the power balance equation (1) including the inertia power Piner of the differential section 14, then power reduction control is performed appropriately, regardless of variation in the differential state of the differential section 14. More specifically, regardless of variation in the engine rotational speed ωe, which is the speed of rotation of the first rotating element (carrier C), in a state where the change in the MG2 rotational speed ωm is limited by the engagement control of the friction engaging apparatuses 18, and more concretely, a state where the MG2 rotational speed ωm is kept near the synchronous rotational speed ωmdoki, the engine rotational speed ωe can be increased appropriately, reduction in the engine rotational speed ωe and smooth uninterrupted gear shift can be performed, and the drivability, fuel consumption and exhaust gases, etc., can be improved. In other words, if the power reduction amount Pdown is set on the basis of the surplus power ΔP which is determined in accordance with the power balance equation (1) including the inertia power Piner of the differential section 14, then similarly to the embodiment described above, the power reduction amount Pdown becomes larger, the lower the engine rotational speed me, and substantially the same action and effects as the embodiment described above are obtained.

Moreover, in this embodiment, since the surplus power ΔP is calculated in accordance with the predetermined power balance equation (1), using the power Pb of the second motor-generator MG2 as a parameter, it is possible to perform power reduction control of the engine 12 appropriately, taking account of the power reduction by regeneration control of the second motor-generator MG2.

Moreover, in this embodiment, since the inertia power Piner of the differential section 14 is calculated using the anticipated engine rotational acceleration dωe1 and the anticipated MG2 rotational acceleration dωm1 determined on the basis of the response delay in the phase lag control of the engine 12, then the engine power Pe is controlled so as to be reduced appropriately, regardless of the response delay in the phase lag control of the engine 12, and the drivability, fuel consumption and exhaust gases, and the like, can be improved yet further.

Figure 11:
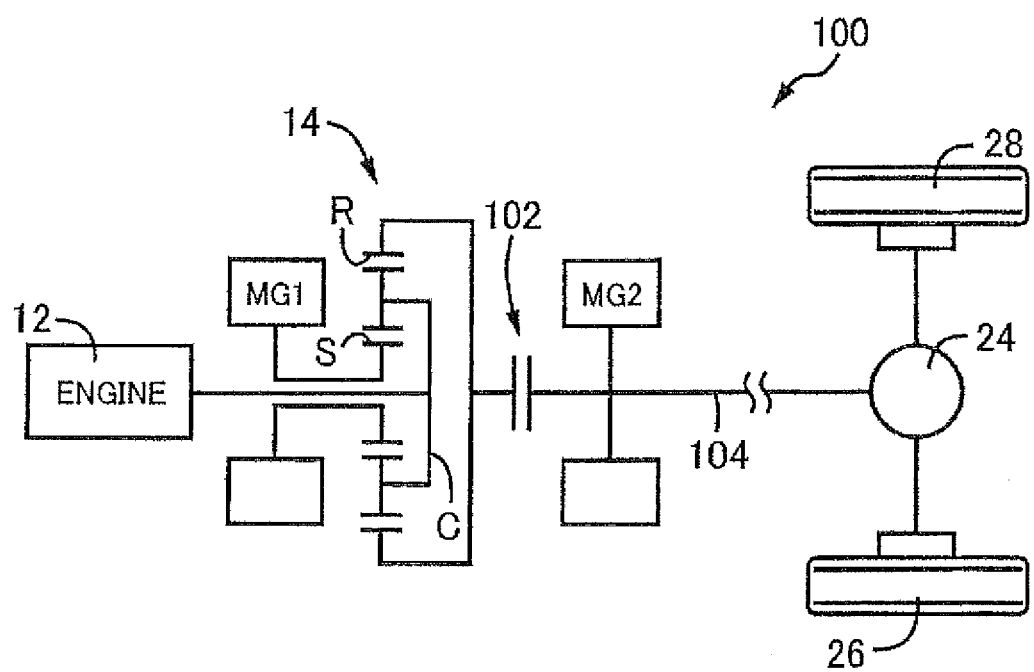
FIG. 11 is a schematic drawing showing a further example of a hybrid vehicle to which this invention is suitably applied.

FIG. 11 is a schematic drawing illustrating a further example of a hybrid vehicle to which this invention is suitably applied, and in this hybrid vehicle 100, when drive power is transmitted to the drive power transmission shaft 104 via the clutch 102, from the ring gear R which is a second rotating element of the differential section 14, then the second motor-generator MG2 is coupled to the drive power transmission shaft 104. The clutch 102 is a hydraulic single-plate or multiple-plate friction engaging apparatus, which corresponds to an engaging and disengaging apparatus. Moreover, the drive power transmission shaft 104 may be coupled directly to the differential gear device 24, but may also be coupled to the differential gear device 24 via the automatic transmission apparatus 20, and the like.

In the hybrid vehicle 100 of this kind, when shifting, for example, from a motor travel mode in which the clutch 102 is released and the vehicle is travelling using only the second motor-generator MG2 as a source of drive force, to an engine travel mode in which the clutch 102 is engaged and the vehicle is travelling using the engine 12 as a source of drive force, or when transferring to the engine travel mode from coasting travel in which the clutch 102 is released, it is possible to perform power reduction control of the engine 12 similarly to the respective embodiments described above, if the speed of rotation of the ring gear R is increased by the power of the engine 12 and the clutch 102 is controlled so as to be connected. In other words, similarly to the flowchart in FIG. 4 described above, power reduction control of the engine 12 may be performed by calculating the rotational speed differential Δω between the engine rotational speed ωe and the reference value meth, and determining the power reduction amount Pdown from a map, or the like, on the basis of the rotational speed differential Δω. Furthermore, similarly to the flowchart in FIG. 8, power reduction control of the engine 12 may be carried out by calculating the surplus power ΔP from the power balance equation and setting the power reduction amount Pdown on the basis of the surplus power ΔP. In this case, in this embodiment, since the second motor-generator MG2 is disposed to the downstream side of the clutch 102, then the surplus power ΔP may be calculated in accordance with the power balance equation in Expression (6) below, without needing to take account of the power Pb of the second motor-generator MG2.

$$\Delta P = Pe - Pc - P\text{iner} \qquad (6)$$

Embodiments of this invention were described in detail above, with reference to the drawings, but these are merely embodiments, and this invention can be implemented in modes incorporating various modifications and improvements on the basis of the knowledge of a person skilled in the art. For example, the prime mover can employ an electric motor, instead of an engine (internal combustion engine) which generates drive power by combustion of fuel. As the rotary machine, it is possible to employ a rotary machine which is used only as an electric motor or only as a generator, rather than a motor-generator which can be used selectively as an electric motor or generator. It is possible to use one or two or more rotary machines. The differential section may use a plurality of planetary gear devices and may have three or more rotating elements which are rotatable relative to each other. The differential section may be provided with a clutch and/or a brake, as necessary. The engaging and disengaging apparatus may use a dry or wet single plate or multiple plate friction engaging apparatus (clutch or brake). The engaging and disengaging apparatus may be an engaging and disengaging apparatus having a single clutch, in which, when the vehicle is coasting with the accelerator off and the clutch disengaged, the clutch is engaged in order to shift to driven travel, when an accelerator off to on operation is performed. The power reduction control of the prime mover may reduce the power by control for closing the throttle depression amount, if an engine is used as the prime mover. The power reduction amount may be determined from a predetermined map on the basis of the speed of rotation of both the first rotating element and the second rotating element. The power reduction amount may be determined by taking the power of the prime mover, the power of the rotary machine, or the like, as parameters, apart from the rotational speed differential Δω. Furthermore, the actual speed of rotation does not necessarily have to be the current speed of rotation, and it is also possible to use a predicted value (anticipated value) determined by taking account of the response delay of the prime mover. The power balance equation (1) may incorporate other power values as parameters, in cases where other power input or output to or from the differential section is present, such as rotational resistance of the various parts due to friction, or the like. If these other power values are of a negligible level, they can be omitted.

What is claimed is:

1. A control apparatus for a vehicle including a differential section having a first rotating element coupled to a prime mover and a second rotating element connected to drive wheels via an engaging and disengaging apparatus, comprising:

a controller configured to control connection of the engaging and disengaging apparatus, the controller being configured to adjust a power of the prime mover, the controller being configured to reduce the power of the prime mover when performing connection of the engaging and disengaging apparatus, and the controller being configured to reduce more power of the prime mover as a speed of rotation of the first rotating element is lower.

2. The control apparatus for a vehicle according to claim 1, wherein:

the controller is configured to determine, as a reference value, a speed of rotation of the first rotating element at which there is zero change in a rotational energy of the differential section with respect to change in the speed of rotation of the first rotating element in case a speed of rotation of the second rotating element is uniform, the controller is configured to calculate a rotational speed differential between an actual speed of rotation of the first rotating element and the reference value, and the controller is configured to determine an amount of power reduction of the prime mover on the basis of the rotational speed differential.

3. A control apparatus for a vehicle including a differential section having a first rotating element coupled to a prime mover and a second rotating element connected to drive wheels via an engaging and disengaging apparatus, comprising:

a controller configured to control connection of the engaging and disengaging apparatus, the controller being configured to adjust a power of the prime mover, the controller being configured to reduce the power of the prime mover when performing connection of the engaging and disengaging apparatus, the controller being configured to determine a surplus power from a predetermined power balance equation using, as parameters, a power of the prime mover, a drive power transmitted to the drive wheels via the engaging and disengaging apparatus, and an inertia power of the differential section, and the controller being configured to determine an amount of reduction in the power of the prime mover on the basis of the surplus power.

4. The control apparatus for a vehicle according to claim 3, further comprising:
a rotary machine operating at least as an electrical generator which is coupled to the differential section, wherein:
the controller is configured to calculate the surplus power in accordance with the following power balance equation (1)

$$\Delta P = Pe - Pc - Pb - Piner \quad (1)$$

where $\Delta P$ represents the surplus power, Pe represents the power of prime mover, Pc represents the drive power transmitted to the drive wheels, Pb represents the power of the rotary machine, and Piner represents the inertia power of the differential section.

5. The control apparatus for a vehicle according to claim 3, wherein:
the controller is configured to calculate the inertia power of the differential section by using respective anticipated rotational accelerations of the first rotating element and the second rotating element, the controller is configured to determine the anticipated rotational accelerations on the basis of a response delay of the prime mover.

6. The control apparatus for a vehicle according to claim 1, further comprising:
an automatic transmission apparatus configured to be coupled to the engaging and disengaging apparatus and to switch between a plurality of gears, wherein:
the controller is configured to reduce the power of the prime mover immediately before an input rotational speed of the automatic transmission apparatus reaches a synchronous rotational speed of a prescribed gear of the plurality of gears, when establishing the prescribed gear while the input rotational speed is increased by the power of the prime mover.

7. The control apparatus for a vehicle according to claim 3, further comprising:
an automatic transmission apparatus configured to be coupled to the engaging and disengaging apparatus and to switch between a plurality of gears, wherein:
the controller is configured to reduce the power of the prime mover immediately before an input rotational speed of the automatic transmission apparatus reaches a synchronous rotational speed of a prescribed gear of the plurality of gears, when establishing the prescribed gear while the input rotational speed is increased by the power of the prime mover.

* * * * *